United States Patent Office 2,734,841
Patented Feb. 14, 1956

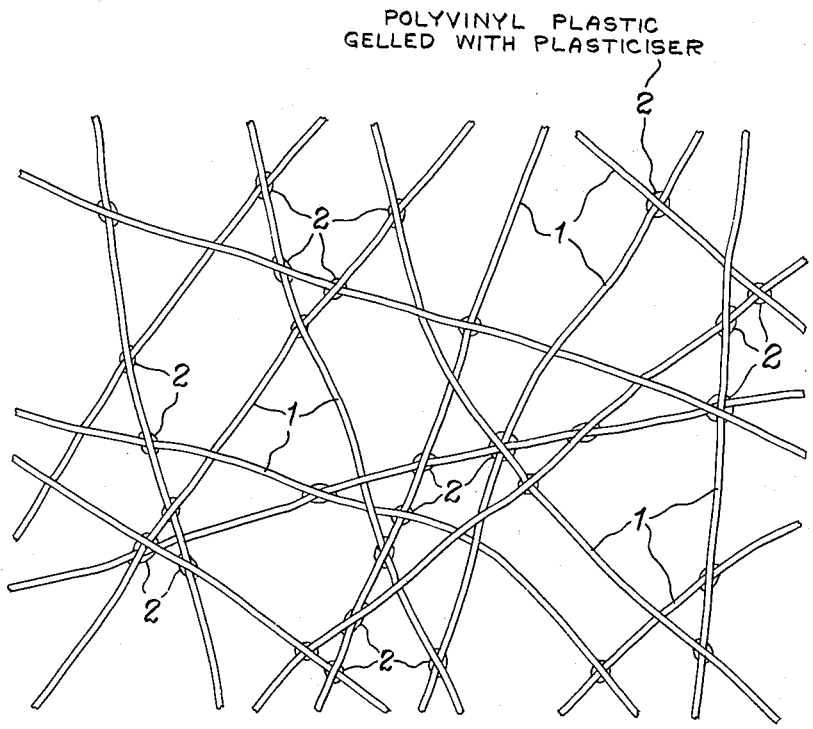

2,734,841
METHOD OF MAKING BONDED RESILIENT FIBROUS MATERIAL

Peter Merriman, Liverpool, England, assignor to Dunlop Tire and Rubber Corporation, Buffalo, N. Y., a corporation of New York Application November 26, 1951, Serial No. 258,287

6 Claims. (Cl. 154—101)

This invention relates to bonded resilient fibrous material for cushions such as are used in upholstery.

It has been known to make resilient pads and similar materials, suitable for use as the fillings for cushions, mattresses and padded furniture which comprise a loose resilient mass of intermingled resilient fibres bonded together by means of rubber. These materials could be made by packing intermingled resilient fibres in a perforated mold and then coating them in the mold with a solution or an aqueous dispersion of rubber, the water or solvent being subsequently evaporated. If the fibres were assembled in an open shallow mold, the solution or dispersion could be sprayed on the fibres. If a closed perforated mold is used, the filled mold was dipped into the solution or aqueous dispersion of rubber. The rubber may be applied as a prevulcanized latex or a latex or solution of unvulcanized rubber compounded with vulcanizing ingredients may be applied and the rubber vulcanized subsequently to remove the water or solvent.

In the production of such materials the difficulty arises that the fibres tend to mat together if they are dipped in the rubber solution or dispersion, or else they tend to settle, and an unsatisfactory product thus results. A difficulty with spraying processes is the limited distance of penetration into the mass of fibres. In both processes the molds become contaminated with dried rubber residues which have to be removed, and this is a troublesome operation.

It has been proposed to apply an adhesive to the dried fibre mass before it is assembled in a mold so that when in the mold contiguous portions of the fibres will adhere together, and matting or settlement of the fibres will thus be avoided. Aqueous dispersions of adhesives, e. g. aqueous dispersions of rubber, have been proposed for this purpose and also solutions of rubber or other adhesive in a volatile solvent, but this preliminary application of an adhesive containing water or volatile solvent has the disadvantage that the length of the cycle of operations is greatly increased by the time required to evaporate the water or solvent, and in many cases a toxic or inflammable vapor is evolved. Moreover, if an aqueous dispersion or solution is used as the adhesive the resilient fibres are softened and temporarily lose their resilience as the result of wetting, and the qualities of the product are thereby impaired.

My invention provides a method of producing molded resilient fibrous materials whereby the above disadvantages are obviated.

According to the present invention, a method of making resilient material composed of bonded resilient fibres comprises applying to a loose web of intermingled fibres a liquid heat-settable adhesive, assembling the web in a mold, and heating to set the adhesive and thus bond the fibres together. Setting of the adhesive may be accomplished by gelling a dispersion of a resin in a plasticizer to a solid gel, the resin being either a thermoplastic or thermosetting resin, or by condensing or polymerizing an incompletely condensed resin to a solid condensed resin.

It is an advantage of this method that the fibres of the mass can be bonded together and the mass caused to retain its shape without the use of a medium containing water or a volatile solvent which is toxic or inflammable, as is the case when a rubber solution is used, and the fibres are not subjected to an aqueous liquid which may cause softening.

It is a further advantage that since the adhesive which bonds the fibres together is not applied to the fibre mass while in the mold, it is unnecessary to use molds which are perforated for drainage, and closed molds can therefore be used which are easier to clean and can be made cheaply of quite thin gauge metal.

It is a further advantage that the time required to set the adhesive is in general very much less than is required to evaporate the liquids in the prior methods involving the use of an adhesive, since setting either by gelling or condensation of the resin is complete almost as soon as the whole mass has reached the setting temperature. The cycle of operations is thus shortened and a greater output than in prior processes can be obtained in a given time from the same number of molds.

The liquid heat-settable adhesive is preferably a dispersion of a finely divided polyvinyl compound in a liquid plasticizer which gels with the polyvinyl compound on heating and may consist of a polymer of vinyl chloride or a copolymer of vinyl chloride with one or more compounds capable of forming interpolymers therewith, e. g. vinyl acetate and/or vinylidene chloride, in an ester plasticizer, for example, dibutyl phthalate or tricresyl phosphate. Such adhesives form coatings on the fibres which are of good strength, flexibility and elastic extensibility. In general, the amount of polyvinyl compound by weight should be about equal or slightly greater than the weight of the plasticizer, and the components of the dispersion should be such that it gels and thus sets at a temperature not greater than 165° C., preferably at about 140° C. to 160° C., in order to avoid damage to the fibres.

The gelling or setting of the adhesive results through heating to a temperature at which the plasticizer coalesces to an irreversible gel with the finely divided polyvinyl compound to form a thermoplastic composition.

An alternative heat-settable adhesive is a phenol-formaldehyde resin in an incompletely condensed liquid condition, the setting being achieved by heating to convert the incompletely condensed liquid resin to the solid state. If the quantity of the adhesive applied is sufficient to bond and also completely coat the fibres the product may be used without further treatment as the filling or cushions or other padded upholstery goods, in which case suitable choice of adhesive will confer the advantage of low flammability.

It is preferred, however, to use a quantity of adhesive sufficient only to interlock the fibres where they come into contact, and then to coat the shaped and bonded fibre mass with rubber latex, to produce a rubberized fibre product.

The structure of a section of an article embodying the invention is shown in the accompanying figure in which fibres, such as horse hair 1 are bonded at their points of intersection by globules 2 of a polyvinyl plastic gelled with plasticiser.

Instead of using a rubber latex to coat the premolded mass fibre, rubber may be applied as a solution in a solvent which does not destroy the existing bonds between the fibres. By reason of the fact that the fibres are bonded at their points of intersection, the mass retains the molded form and the rubber coat can be applied without the use of molds, which means that the product can be dried much more quickly because it is not confined in a mold and free access of air for drying is possible.

Another advantage of this method is that the step of cleaning molds contaminated with rubber residues is avoided, thus saving time and labor.

It has been found that because no rubber has been applied during the preliminary steps to bond the resilient fibres together, a rubber dispersion or solution can be used of a higher rubber concentration than has been possible hitherto without depositing too thick a rubber layer on the fibres. On this account also the rate of drying is increased and the amount of dripping and draining which occurs during the drying operation is reduced.

In one method of making molded products according to the invention, horsehair is passed through an opening machine and then roughly spread by hand or machine in the form of a web of approximately even density and about three inches thickness. The hair is then wetted with a liquid paste comprising finely divided polyvinyl chloride dispersed in an ester plasticizer. This paste is distributed on the hair by feeding the web beneath a row of closely spaced jets into the nip between a pair of metal rollers. The rollers are geared to drive a cog pump which feeds the paste to the jets and thus delivers an amount of paste onto the hair proportionate to the area of web passing through the rollers.

The rollers are tightly spring-loaded and force the paste uniformly throughout the hair mass which on emerging passes into an opening machine of normal design. The opened wetted hair is then assembled in molds to give a mass of intermingled hair of the desired predetermined density and the assembly is heated to 140° C. to 160° C. to set the adhesive by causing the plasticizer and the polyvinyl chloride to coalesce, thus locking the hairs together where they are contiguous. The amount of paste used for this operation may be for example 50% to 100% by weight of the hair. The thus shaped mass of hair is then removed from the mold and dipped in concentrated rubber latex compounded with vulcanizing ingredients so as to be capable of vulcanizing the rubber to a high modulus vulcanized rubber at a temperature of the order of 100° C. After dipping, the excess latex is allowed to drain off, the mass of rubberized hair is then dried and the rubber is vulcanized by heating at 100° C. for a suitable time.

According to an alternative method of making molded products according to the invention, horsehair is wetted with a liquid adhesive comprising finely divided polyvinyl chloride dispersed in an ester plasticizer. The paste is distributed on the hair by spreading the hair in thin layers and applying the paste thereto by spraying. The hair is then assembled in molds and the subsequent setting of the adhesive followed by dipping in rubber latex and vulcanization is carried out as described above.

Having described my invention, what I claim is:

1. A method of making resilient material of bonded resilient fibers which comprises feeding of web of opened fibers into the nip between a pair of rolling surfaces, supplying a bonding material in closely spaced jets into said web before it passes into the nip between said pair of rolling surfaces, said bonding material consisting of two phases, one phase being a liquid plasticizer and the other phase being a finely divided solid plastic dispersed in said plasticizer, said bonding material being in amount sufficient to bond said fibers at their points of contact and insufficient to span the spaces between said fibers, permitting said web to expand after passing through said nip and thereafter gelling said bonding material.

2. The method of claim 1 in which after gelling said bonding material the web of intermingled fibers is coated with a dispersion of rubber and subsequently dried.

3. The method of claim 2 wherein the quantity of bonding material is equal to between 50% and 100% by weight of the fibers.

4. A method of making resilient material of bonded resilient fibers which comprises applying to the individual fibers throughout a loose open web of intermingled fibers a bonding material consisting of two phases, one phase being a liquid plasticizer and the other phase being a finely divided solid plastic dispersed in said liquid plasticizer, said bonding material being in amount sufficient to bond said fibers at their points of contact and insufficient to span the spaces between said fibers, molding said fibers and thereafter gelling said bonding material.

5. A method of making resilient material of bonded resilient fibers which comprises applying to the individual resilient fibers throughout a loose open mass of intermingled fibers a bonding material consisting of two phases, one phase being a liquid plasticizer and the other phase being a finely divided solid plastic dispersed in said liquid plasticizer, said bonding material being in amount sufficient to bond said fibers at their points of contact and insufficient to span the spaces between said fibers, compressing said mass of fibers after the application of said bonding material then opening said mass of material after compression to distribute the bonding material uniformly throughout the mass and then gelling said bonding material.

6. The method of claim 5 in which the mass of intermingled fibers is molded prior to gelling.

References Cited in the file of this patent

UNITED STATES PATENTS

| | | |
|---|---|---|
| 1,906,028 | Weber et al. | Apr. 25, 1933 |
| 2,003,935 | Howard | June 4, 1935 |
| 2,054,131 | Kollek | Sept. 15, 1936 |
| 2,128,635 | Charch et al. | Aug. 30, 1938 |
| 2,224,679 | Hershberger | Dec. 10, 1940 |
| 2,339,562 | Eustis | Jan. 18, 1944 |
| 2,354,426 | Briant | July 25, 1944 |
| 2,455,534 | Talalay | Dec. 7, 1948 |
| 2,497,454 | Illingworth et al. | Feb. 14, 1950 |
| 2,574,849 | Talalay | Nov. 13, 1951 |
| 2,580,202 | Talalay et al. | Dec. 25, 1951 |
| 2,582,915 | Sebok | Jan. 15, 1952 |
| 2,618,580 | Lancaster | Nov. 18, 1952 |
| 2,671,496 | Chavannes et al. | Mar. 9, 1954 |

OTHER REFERENCES

Synthetic Resins and Allied Plastics, Morrel, 2nd edition, pp. 201, 203, 1943.